United States Patent [19]

Fiori, Jr.

[11] Patent Number: 4,637,265
[45] Date of Patent: Jan. 20, 1987

[54] SENSOR APPARATUS
[75] Inventor: David Fiori, Jr., Yardley, Pa.
[73] Assignee: Sensor Technologies, Inc., Bensalem, Pa.
[21] Appl. No.: 757,726
[22] Filed: Jul. 22, 1985
[51] Int. Cl.[4] ............................ G01L 3/10; G01B 7/16
[52] U.S. Cl. .................................. 73/862.33; 73/779; 324/207; 331/65
[58] Field of Search ...................... 73/862.33, 773, 779; 324/207, 208, 57 Q; 331/65; 340/870.31; 332/29 M, 56, 181

[56] References Cited
U.S. PATENT DOCUMENTS

| 2,732,713 | 1/1956 | Willits | 73/862.33 X |
| 3,656,132 | 4/1972 | Brumbelow | 340/870.31 X |
| 3,906,787 | 9/1975 | Wingbermuhle | 73/862.33 |

*Primary Examiner*—Charles A. Ruehl
*Attorney, Agent, or Firm*—Ratner & Prestia

[57] ABSTRACT

Sensor apparatus which uses non-contacting, inductance coil sensors to transfer information about a parameter being monitored from a moving member to an indicator mechanically isolated from the moving member. The inductance coil sensors each have a stationary tank circuit and a movable tank circuit which are inductively coupled to produce a double resonance curve for the stationary tank circuit. The parameter is sensed by a unit having inductively coupled components. This unit is connected to the moving tank circuit to change the inductance of the moving tank circuit in accordance with changes in the inductive coupling of the sensing unit which, in turn, are dependent upon the parameter being monitored. As the inductance of the moving tank circuit changes, the relative frequency, amplitude and phase characteristics of the resonance peaks of the stationary tank circuit change. The degree of change of these characteristics is a measure of parameter. In order to reduce or eliminate common mode errors, the sensing unit is arranged to develop oppositely directed signals which are time multiplexed to produce difference signals.

52 Claims, 10 Drawing Figures

SENSOR APPARATUS

TECHNICAL FIELD

The present invention relates, in general, to sensor apparatus for developing indications of changes in a parameter being monitored and, in particular, to systems which employ non-contacting inductance coil sensors. Although the invention will be described in connection with a torque indicating system, it will be apparent that the invention has application in monitoring other parameters.

BACKGROUND ART

Non-contacting sensors are well known. Such sensors are particularly useful when the constant moving, frictional contact between parts in a contacting sensor which might otherwise be used causes excessive wear of the parts and ultimate failure of the sensor. Non-contacting sensors are required in those applications where the parts move, relative to one another, in such a way that connections cannot be maintained. For example, a rotating shaft, undergoing a number of rotations, will cause the connecting wires of a contacting sensor to twist and break as the shaft turns.

Inductance coils are commonly used in noncontacting sensors. Typically, such sensors include a pair of coils which are inductively coupled. As one coil moves relative to the other, or as a "spoiler" moves between the two coils, the inductive coupling between the two coils changes in accordance with the relative movement of the coils or the movement of the "spoiler".

One technique for processing the signals of an inductance coil sensor to develop an indication of changes in the parameter being monitored involves measuring the effect of a shift in resonance frequency of a tank circuit which includes, as one of its components, one of the inductance coils. As one coil moves relative to the other, or as a "spoiler" moves between the two coils, the resonance frequency of the tank circuit shifts in accordance with the movement.

Three copending applications, filed in the name of the present applicant and assigned to the same assignee to which this application is assigned, are directed to non-contacting inductance coil sensors and processing circuitry which detects shifts in the characteristics of a tank circuit as the inductive coupling between two coils is altered by changes in the parameter being monitored. These copending applications, all filed on Feb. 11, 1985, are "Inductance Coil Sensor", Ser. No. 700,295; "Sensor Apparatus", Ser. No. 700,081; and "Sensor Apparatus", Ser. No. 700,188.

Non-contacting sensor systems, prior to those disclosed and claimed in the above-identified copending applications, have failed to satisfy concurrently the requirements of accuracy, efficient signal processing, reasonable cost, and limited size and weight. These criteria are particularly important when the sensor system is to be applied to a consumer product, such as an automobile.

The invention disclosed and claimed in the present application, employing certain of the concepts and techniques disclosed and claimed in the above-identified copending applications, extends the utility of monitoring a parameter by sensing shifts in the characteristics of a tank circuit to uses in which the sensors sense relative movements within a moving assembly. A typical use, and one which will be described in detail in this application, is sensing the twist imparted to a torqued rotating shaft.

DISCLOSURE OF THE INVENTION

It is an objective of the present invention to provide a new and improved non-contacting sensor system.

It is another objective of the present invention to provide a torque indicating system which uses non-contacting, inductively coupled coils as the sensor components.

It is a further objective of the present invention to provide a non-contacting sensor system which is efficient and reliable in operation and employs a minimum number of circuit components in its signal processing circuitry.

These and other objectives are achieved, according to the present invention, by sensor apparatus which includes a sensor unit composed of first and second inductively coupled tank circuits which produce a double resonance curve for the first tank circuit. The first tank circuit is mechanically isolated from a member to which movement is imparted, while the second tank circuit is affixed to this member. The sensor unit also includes sensing means affixed to the moving member, electrically connected to the second tank circuit and responsive to a parameter being monitored for changing the inductance of the second tank circuit in accordance with changes in the parameter. This changes the relative resonance frequencies of the first tank circuit, the relative amplitudes of the resonance peaks of the first tank circuit, and the relative phases about the resonance peaks of the first tank circuit. The sensor apparatus further includes circuit means responsive to at least one of the changing characteristics of the first tank circuit for developing indications of changes in the parameter.

BRIEF DESCRIPTION OF THE DRAWINGS

Referring to the drawings.

BEST MODE OF CARRYING OUT THE INVENTION

Referring to FIGS. 1, 2, 3, 4A, 4B, and 4C, a torque indicating system, constructed in accordance with the present invention, includes an inductance coil sensor composed of a first tank circuit having an inductance coil 10 and a capacitor 12 and a second tank circuit having an inductance coil 14 and a capacitor 16. The first tank circuit is mechanically isolated from a member 18 to which torque is applied, and the second tank circuit is affixed to this member.

Figure 1:
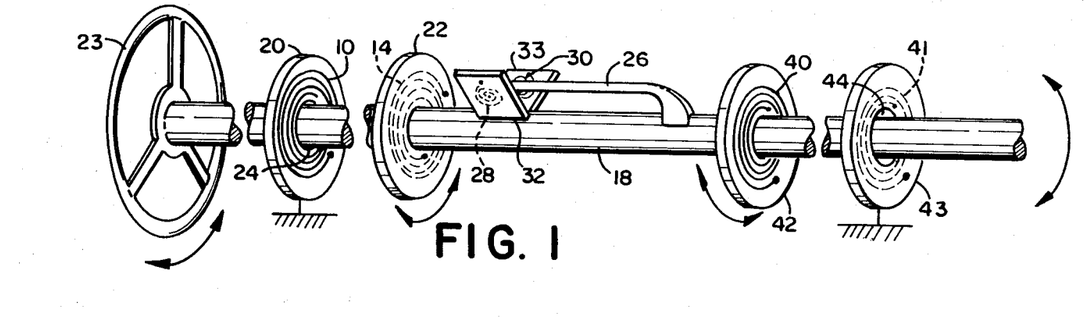
FIG. 1 is a perspective view of a preferred embodiment of the present invention as applied to a torque indicating system and shows the manner in which the component parts of such a system may be arranged physically.

As shown in FIG. 1, inductance coils 10 and 14 may be in the form of planar coils positioned on insulating boards 20 and 22, respectively. The two coils may be formed by conventional printed circuit techniques with each having a generally circular shape.

FIG. 1 illustrates the application of the present invention to the steering column of an automobile which is represented by reference numeral 18. A steering wheel 23 is secured to one end of steering column 18 to turn the column, while the other end of the column is linked to the wheels of the automobile in the usual way.

Insulating board 20, carrying inductance coil 10, has a clearance hole 24 through which steering column 18 passes. In this way, the first tank circuit, composed of inductance coil 10 and capacitor 12, is mechanically isolated from steering column 18 and remains stationary. This is represented by the ground symbol at the bottom of insulating board 20 and may be accomplished by fastening this insulating board to a non-moving part of the automobile.

Figures 2, 3:
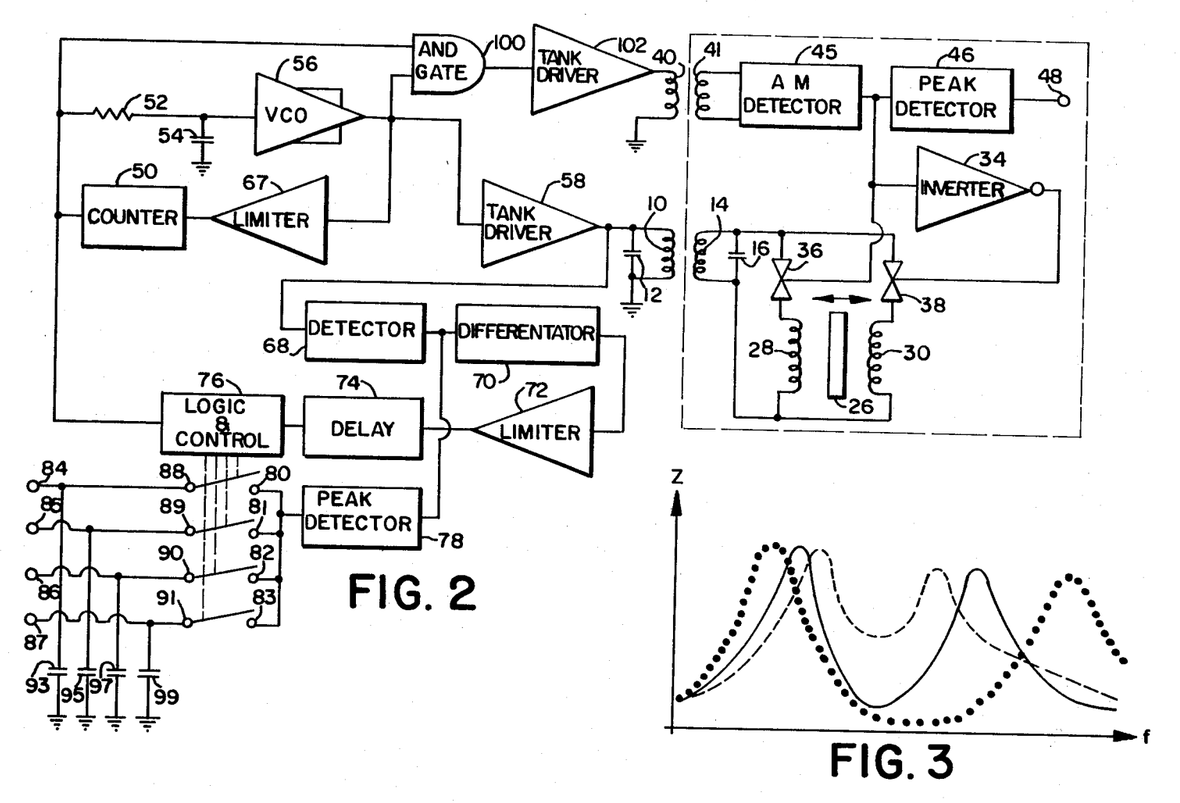
FIG. 2 is a circuit diagram of the torque indicating system shown in FIG. 1.
FIG. 3 shows the characteristic curves of a tank circuit, which is part of the system shown in FIGS. 1 and 2, for three different torque conditions of a member which is torqued.

Insulating board 22 which carries inductance coil 14 is affixed to steering column 18 and turns with the steering column. As a result, the second tank circuit, composed of inductance coil 14 and capacitor 16, is movable with steering column 18. This is represented in FIG. 2 by the dashed lines which enclose a number of components.

The two tank circuits are positioned, relative to one another, so that they are inductively coupled and produce a double resonance curve for the stationary tank circuit. Three characteristic curves, for three different inductances of the movable tank circuit, are shown in FIG. 3. The solid-line characteristic corresponds to the movable tank circuit having a larger inductance than for the dotted-line characteristic and a smaller inductance than for the dashed-line characteristic.

A torque indicating system, constructed in accordance with the present invention, further includes torque sensing means electrically connected to the movable tank circuit and responsive to the torque applied to member 18 for changing the inductance of the movable tank circuit in accordance with changes in the torque applied to member 18. For the embodiment illustrated in FIGS. 1 and 2, such torque sensing means include a metal vane 26, secured to steering column 18 at one point along the axis of the torque applied to the steering column and a pair of angularly spaced identical inductance coils 28 and 30, carried on a pair of insulating boards 32 and 33, respectively, secured to the steering column at a second point on the steering column and between which vane 26 extends. Inductance coils 28 and 30 are electrically connected, in timed alternating sequence, to inductance coil 14 through a switching circuit which will be described below.

As steering wheel 23 is turned and a load exists at the opposite end of steering column 18, the rotational position of vane 26, relative to the rotational positions of inductance coils 28 and 30, changes by an amount dependent upon the torque applied to the steering column because coils 28 and 30 and vane 26 are offset along the torque axis. The vane approaches or moves away from inductance coils 28 and 30 depending upon the direction in which steering wheel 23 is turned. Such movement of vane 26, relative to inductance coils 28 and 30, alters the inductive coupling between the vane and these inductance coils and, in turn, changes the inductance of the movable tank circuit as each of the inductance coils 28 and 30 is connected, through the switching circuit, to the movable tank circuit. This, in turn, changes the relative resonance frequencies of the stationary tank circuit, the relative amplitudes of the resonance peaks of the stationary tank circuit and the relative phases about the resonance peaks of the stationary tank circuit.

FIG. 3 shows the changes in the relative resonance frequencies and the changes in relative amplitudes of the resonance peaks of the stationary tank circuit when one or the other of the two inductance coils 28 or 30 is connected to the movable tank circuit. As indicated, the taller peaks occur at the lower resonance frequencies and the shorter peaks occur at the higher resonance frequencies. When inductance coil 28 is connected to the movable tank circuit, the relative resonance frequencies and the relative amplitudes of the resonance peaks of the stationary tank circuit change in one direction for a particular movement of vane 26 and when inductance coil 30 is connected to the movable tank circuit, the resonance characteristics of the stationary tank circuit change in an opposite direction for the same movement of the vane.

The switching circuit which connects inductance coils 28 and 30 to the movable tank circuit in timed alternating sequence is composed of an inverter 34 and a pair of automatic switches 36 and 38. The switching sequence and the power required to operate the switching circuit are developed from a second inductive coupling between the stationary and moving parts. This is represented by a transformer having primary and secondary windings 40 and 41 carried, respectively, on insulating boards 42 and 43. Insulating board 42 is affixed to steering column 18 and turns with the steering column, while insulating board 43, having a clearance hole 44 through which the steering column passes, remains stationary. The source of power to operate the switching circuit and the signals which control the switching circuit will be described below.

An AM detector 45 and a peak detector 46 form a power supply and function in the usual manner to develop a power supply voltage, represented by a terminal 48, to operate inverter 34 and switches 36 and 38. The output of AM detector 45 also controls the operation of switches 36 and 38. AM detector 45, peak detector 46, inverter 34, and switches 36 and 38 may be mounted on insulating board 14 or on insulating board 42 so that they move with steering column 18. The movement of these components and winding 41 is represented in FIG. 2 by their inclusion within the dashed lines.

The actual connections between terminal 48 and inverter 34, switch 36, and switch 38 have been omitted from FIG. 2 for the sake of clarity. Similarly, various components shown in FIG. 2 have been omitted from FIG. 1 for the sake of clarity.

A torque indicating system, constructed in accordance with the present invention, also includes circuit means responsive to at least one of the changing characteristics (resonance frequencies, resonance peak amplitudes, or resonance peak phases) of the first tank circuit for developing indications of changes in the torque applied to member 18. Such means may include a counter 50 which supplies control signals, in the form of a series of pulses, such as the ones shown in waveform (A) of FIGS. 4A, 4B, and 4C, to an RC circuit composed of a resistor 52 and a capacitor 54. The duration of the pulses of waveform (A) is equal to the time between pulses. The RC circuit produces a ramp and decay signal, such as the one shown by waveform (B) of FIGS. 4A, 4B, and 4C, which is supplied to a voltage-controlled oscillator (VCO) 56. As the input signal to VCO 56 repetitively rises and falls, the frequency of the signal produced by the VCO repetitively increases and decreases. This is shown by waveform (C) of FIGS. 4A, 4B, and 4C.

Figure 4A:
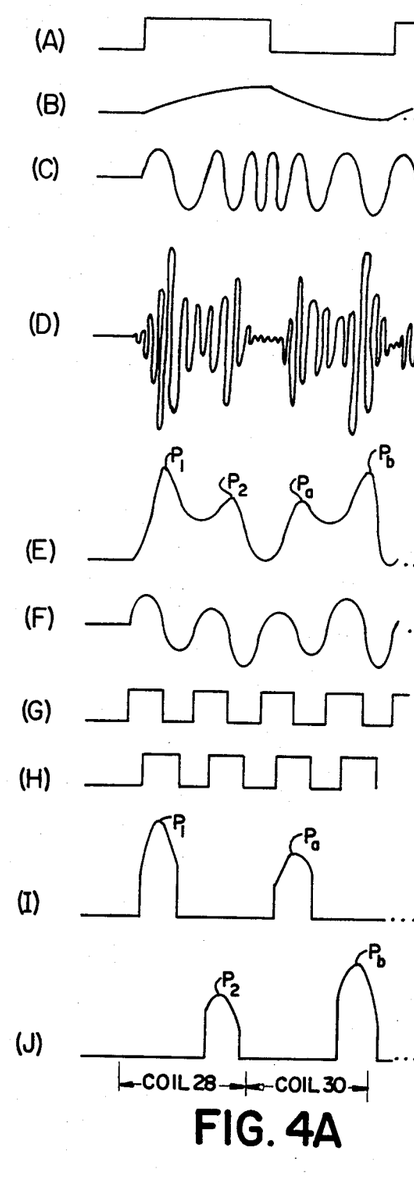
FIGS. 4A, 4B, and 4C are a first series of waveform diagrams useful in understanding the operation of the FIG. 2 circuit.
Figure 4B:
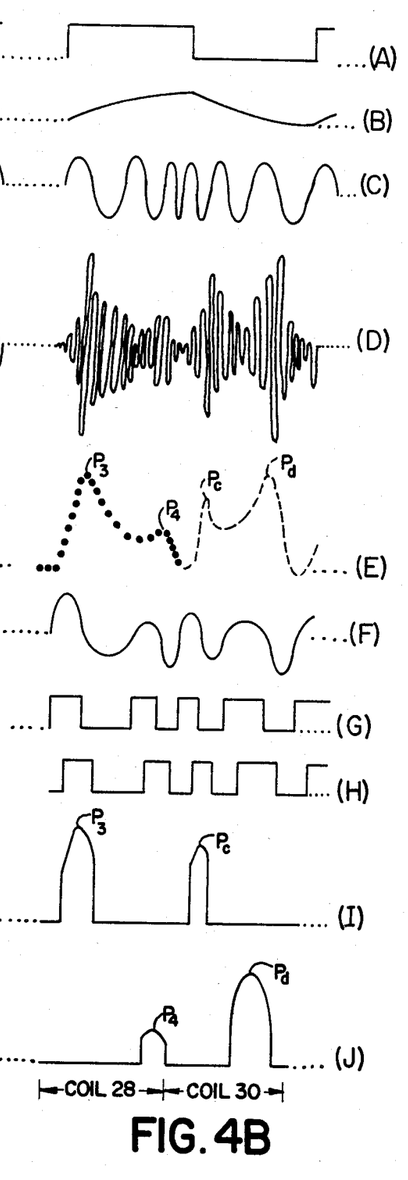
Figure 4C:
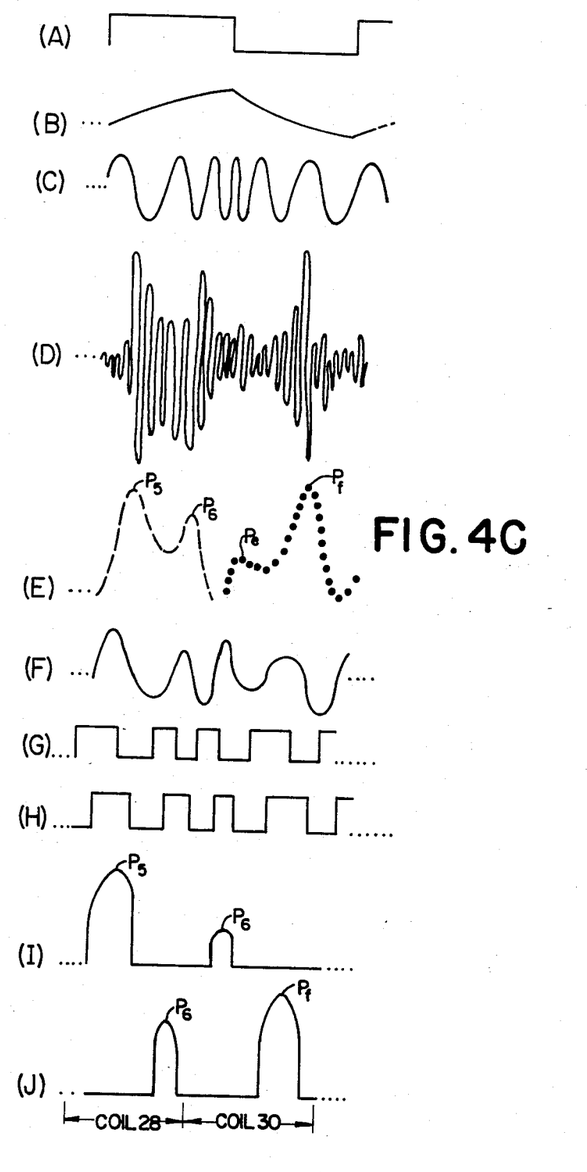

The waveforms of FIGS. 4A, 4B, and 4C illustrate three different torque conditions of member 18. The waveforms of FIG. 4A correspond to a balanced condition with vane 26 equidistant from inductance coils 28 and 30. The waveforms of FIG. 4B correspond to an applied torque which positions vane 26 closer to one of the inductance coils. The waveforms of FIG. 4C correspond to an applied torque which positions vane 26 closer to the other inductance coil.

The repetitive varying frequency signal produced by VCO 56 is supplied, through a tank driver 58, to the stationary tank circuit composed of inductance coil 10 and capacitor 12. Tank driver 58 functions as a constant current source.

The signal produced by VCO 56 also is supplied to a limiter 67 and the pulses produced by limiter 67 are supplied to counter 50. After a prescribed number of pulses from limiter 67 are counted, counter 50 changes state to produce the pulses of waveform (A) of FIGS. 4A, 4B, and 4C.

Waveform (D) of FIGS. 4A, 4B, and 4C shows the double resonance characteristic of the stationary tank circuit. A signal of varying amplitude is produced in response to the signal of varying frequency which is supplied from VCO 56. The two peak amplitudes occur at the two resonance frequencies.

The signal of waveform (D) is supplied to a detector 68 which develops the envelope of the varying amplitude signal produced by the stationary tank circuit in response to the varying frequency signals supplied by VCO 56. This envelope signal is shown by waveform (E) of FIGS. 4A, 4B, and 4C.

The first pair of peaks of waveforms (D) and (E) corresponds to the connection of inductance coil 28 to the moving tank circuit, while the second set of peaks of wavesforms (D) and (E) corresponds to the connection of inductance coil 30 to the moving tank circuit. This is indicated just below waveform (J) of FIGS. 4A, 4B, and 4C. The reversal in the sequence of the higher and lower peaks is due to the fact that the second set of peaks is produced by the decay of the ramp signal, represented by waveform (B), which is opposite to the rise of the ramp signal.

The dotted-line and dashed-line detected signals in waveform (E) of FIGS. 4B and 4C and the varying amplitude signals of waveform (D) of FIGS. 4B and 4C from which the detected signals are developed represent a change in position of vane 26 relative to inductance coils 28 and 30. This change in position of the vane is indicated by the change in the difference in amplitude between corresponding resonance peaks.

The difference in amplitude between resonance peaks $P_1$ and $P_2$ of FIG. 4A is less than the difference in amplitude between resonance peaks $P_3$ and $P_4$ of FIG. 4B and greater than the difference in amplitude between resonance peaks $P_5$ and $P_6$ of FIG. 4C. Conversely, the difference in amplitude between resonance peaks $P_b$ and $P_a$ of FIG. 4A is greater than the difference in amplitude between resonance peaks $P_d$ and $P_c$ of FIG. 4B and less than the difference in amplitude between resonance peaks $P_f$ and $P_e$ of FIG. 4C. As with FIG. 3, the solid-line characteristic of waveform (E) of FIG. 4A corresponds to the movable tank circuit having a larger inductance than for the dotted-line characteristics of waveform (E) of FIGS. 4B and 4C and a smaller inductance than for the dashed-line characteristics of waveform (E) of FIGS. 4B and 4C.

The detected signal, shown in waveform (E) of FIGS. 4A, 4B, and 4C, is supplied to a differentiator 70 which produces a signal such as the one shown by waveform (F) of FIGS. 4A, 4B, and 4C. The differentiated signal is supplied to a limiter 72 and the output of the limiter, shown by waveform (G) of FIGS. 4A, 4B, and 4C, is delayed by a delay circuit 74. The delayed signal, shown by waveform (H) of FIGS. 4A, 4B, and 4C, is supplied to a logic and control circuit 76.

The output of detector 68 also is supplied to a peak detector 78 which provides, in timed alternating sequence, outputs of the peaks of the signals represented by waveform (E) at four terminals 80, 81, 82, and 83. Logic and control circuit 76, in response to the delayed signal represented by waveform (H), gates the outputs of peaks $P_1$ or $P_3$ or $P_5$ to an output terminal 84, the outputs of peaks $P_2$ or $P_4$ or $P_6$ to an output terminal 85, the outputs of peaks $P_a$ or $P_c$ or $P_e$ to an output terminal 86, and the outputs of peaks $P_b$ or $P_d$ or $P_f$ to an output terminal 87. The function of logic and control circuit 76 is represented by the four dashed outputs which control four switches 88, 89, 90, and 91 to close, in timed alternating sequence, so that when the outputs of peaks $P_1$ or $P_3$ or $P_5$ are at terminal 80, switch 88 is closed; when the outputs of peaks $P_2$ or $P_4$ or $P_6$ are at terminal 81, switch 89 is closed; when the outputs of peaks $P_a$ or $P_c$ or $P_e$ are at terminal 82, switch 90 is closed; and when the outputs of peaks $P_b$ or $P_d$ or $P_f$ are at terminal 83, switch 91 is closed. As a result, the difference between the outputs at terminals 84 and 85 and the difference between the outputs at terminals 86 and 87 represent the difference in the amplitudes of the resonance peaks. As the amplitudes of the resonance peaks change, in accordance with movement of vane 26, the differences between the outputs also change. Waveforms (I) and (J) of FIGS. 4A, 4B, and 4C show the effect of logic and control circuit 76 closing switches 88, 89, 90, and 91, respectively. Waveform (I) represents the difference between the outputs at terminals 84 and 85, while waveform (J) represents the difference between the outputs at terminals 86 and 87.

By comparing the difference between the outputs at terminals 84 and 85 (waveform (I)) with the difference between the outputs at terminals 86 and 87 (waveform (J)), an indication of the position of vane 26 is developed. For FIG. 4A, the difference between peaks $P_1$ and $P_2$ is the same as the difference between peaks $P_b$ and $P_a$, thereby indicating that vane 26 is midway between inductance coils 28 and 30. For FIG. 4B, the difference between peaks $P_3$ and $P_4$ is greater than the difference between peaks $P_d$ and $P_c$, thereby indicating that vane 26 is closer to inductance coil 30 than to inductance coil 28. For FIG. 4C, the difference between peaks $P_5$ and $P_6$ is less than the difference between peaks $P_f$ and $P_e$, thereby indicating that vane 26 is closer to inductance coil 28 than to inductance coil 30.

As shown in FIG. 2, the output signal from VCO 56 also is supplied to an AND gate 100. The second input to AND gate 100 is the control signals from counter 50 which is represented by waveform (A) of FIGS. 4A, 4B, and 4C. Thus, the pulses from counter 50 modulate the output signal from VCO 56 and only those portions of the output signal from VCO 56 which occur during the pulses of waveform (A) are passed to a tank driver 102 and, in turn, coupled through winding 40 to inductance coil 41. AM detector 45 develops a signal, generally similar to the control signals from counter 50, which is supplied directly to switch 36 and through inverter 34 to switch 38 to open and close switches 36 and 38 in timed alternating sequence to multiplex inductance coils 28 and 30.

In order to assure proper synchronization of the sensing and passage of the peaks of the detected signal, the control pulses supplied by counter 50 are also supplied to logic and control circuit 76. This circuit is arranged to sense the change in level of the signal represented by waveform (A) and condition the passage of the next peak upon the sensing of such a change.

As shown in FIG. 2, output terminals 84, 85, 86, and 87 are connected to ground through capacitors 93, 95, 97, and 99, respectively. It will be apparent that switches 88, 89, 90, and 91, shown for simplicity as electro-mechanically controlled switches, can be, and preferably are, entirely electronic.

By multiplexing inductance coils 28 and 30 and processing the resonance peak signals in the manner described, common mode errors are reduced or eliminated. For a particular source of an error, the error component is reflected in two equal and oppositely directed signals which, upon being combined, tend to cancel one another.

It should be noted that by making inductance coils 10 and 14 rotationally symmetric, the relative rotational movement between the two, when torque is applied to member 18, does not adversely affect the inductive coupling and contribute to changes in the resonance frequency, the resonance peaks or the resonance peaks phase. Similarly, signal transfer between windings 40 and 41 can be maintained constant for different relative rotational positions by making these two coils rotationally symmetric.

Figure 5:
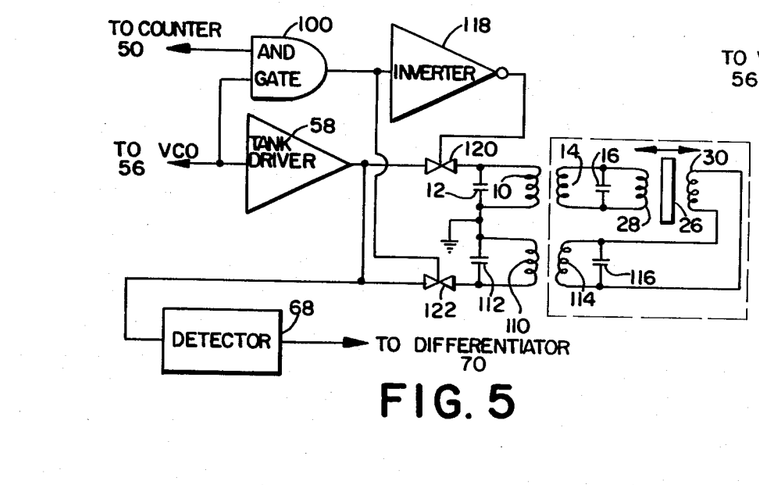
FIG. 5 shows an alternative arrangement for the inductance coil sensor portion of the system shown in FIGS. 1 and 2.

FIG. 5 shows a second embodiment of a torque indicating system constructed in accordance with the present invention. The FIG. 5 embodiment differs from the one just described by the addition of a second stationary tank circuit and a second movable tank circuit and the multiplexing of the stationary tank circuits rather than inductance coils 28 and 30. The second stationary tank circuit is composed of an inductance coil 110 and a capacitor 112 and the second movable tank circuit is composed of an inductance coil 114 and a capacitor 116. With inductance coils 28 and 30 being identical, the two pairs of tank circuits also are identical.

Each pair of tank circuits produce a double resonance curve for their stationary tank circuits. Inverter 118 and switches 120 and 122 function in an equivalent manner to inverter 34 and switches 36 and 38 shown in FIG. 2 to select one of the tank circuit pairs and then the other, in timed alternating sequence, thereby selecting the double resonance curves of the stationary tank circuits in timed alternating sequence. By multiplexing the two stationary tank circuits, tank driver 102, windings 40 and 41, AM detector 45 and peak detector 46, all present in the FIG. 2 embodiment, are not needed.

The operation of the embodiment of the invention shown in FIG. 5 is equivalent to the operation of the embodiment shown in FIG. 2. As vane 26 moves towards or away from inductance coils 28 or 38, the inductances of the two movable tank circuits to which coils 28 and 30 are connected change accordingly. This, in turn, causes corresponding changes in the resonance frequency, peak amplitude, and phase of the two stationary tank circuits.

Figure 6:
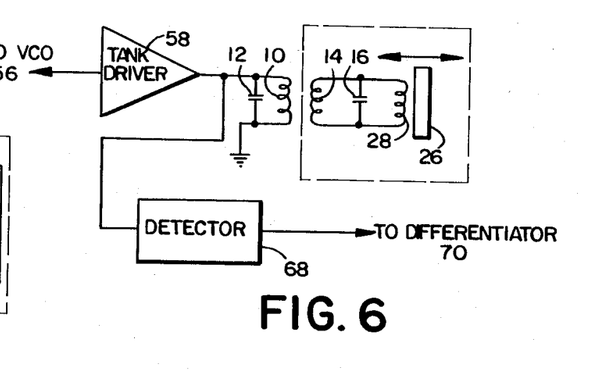
FIG. 6 shows another alternative arrangement for the inductance coil sensor portion of the system shown in FIGS. 1 and 2.

When it is unnecessary to reduce or eliminate common mode errors, only one or the other of inductance coils 28 and 30 is needed. This is shown in FIG. 6. For this embodiment of the invention, the second pair of peaks are not developed because only one of the inductance coils 28 or 30 is present in the circuitry.

Figure 7:
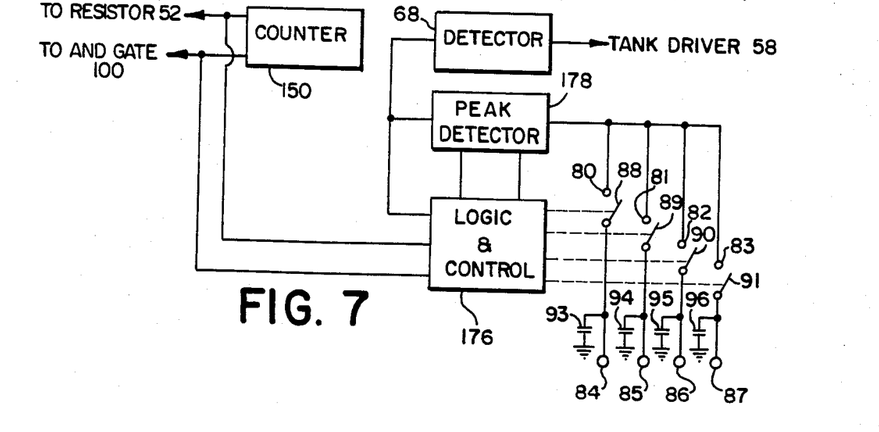
FIG. 7 is a circuit diagram of an alternative arrangement for processing the signals of the torque indicating system shown in FIG. 1.
Figure 8:
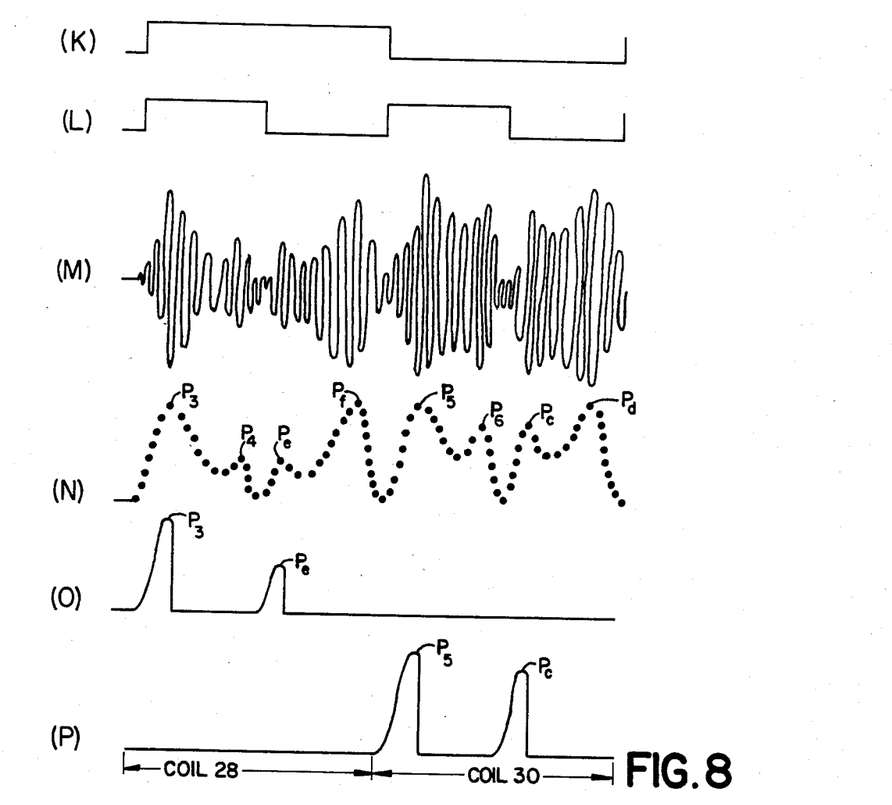
FIG. 8 is a second series of waveform diagrams useful in understanding the operation of the FIG. 7 circuit.

FIG. 7 shows an alternative circuit for processing the signals developed by the stationary tank circuit and FIG. 8 shows waveforms useful in understanding the operation of this circuit. The difference between the FIG. 7 circuit and the FIGS. 2 and 5 circuits is in the number of peaks of the double resonance curves which are sampled to produce indications of the parameter being monitored. Only those portions of the FIG. 7 circuit which differ from the FIGS. 2 and 5 circuits are shown in FIG. 7. Appropriate connections of the FIG. 7 circuit to the remainder of the FIGS. 2 and 5 circuits are indicated in FIG. 7.

Waveforms (K) and (L) in FIG. 8 represent first and second control signals, in the form of two series of pulses, produced by a counter 150 in the FIG. 7 circuit. The pulses of waveform (K) are supplied to AND gate 100 and a logic and control circuit 176, while the pulses of waveform (L) are supplied to resistor 52 and logic and control circuit 176. The frequency of the pulses of waveform (L) is twice the frequency of the pulses of waveform (K). As a result, the stationary tank circuit produces mirror-image double resonance curves, such as the ones shown in waveform (M), for all positions of vane 26, while the moving sensing means is taken through one multiplex cycle. The first pair of mirror-images corresponds to the connection of inductance coil 28 to the moving tank circuit, while the second pair of mirror-images corresponds to the connection of inductance coil 30 to the moving tank circuit. The mirror-images are produced because the stationary tank circuit is taken through a rise in frequency and a drop in frequency by VCO 56, while one of the inductance coils 28 or 30 is connected to the moving tank circuit and then through another rise in frequency and a drop in frequency, while the other inductance coil is connected to the moving tank circuit.

In contrast, in the FIG. 2 circuit, the multiplex rate of the moving sensing means is one-half the rate at which the stationary tank circuit is taken through a complete cycle of rising and falling frequency. Thus, as indicated by waveform (D) in FIGS. 4A, 4B, and 4C, the FIG. 2 circuit produces asymmetric double resonance curves for all positions of vane 26, except when the vane is in the neutral position. Waveform (M) in FIG. 8 represents a condition of vane 26 being closer to coil 30 than to coil 28.

It will be understood that the stationary tank circuit may not produce precise mirror-images because the ramp and decay signal, developed by resistor 52 and capacitor 54 and shown by waveform (B) in FIGS. 4A, 4B, and 4C, is not perfectly linear. However, with the addition of linearizing components, precise mirror-images may be developed as required.

The signal represented by waveform (M) is supplied to detector 68 which develops the envelope of the varying amplitude signal produced by the stationary tank circuit. This envelope signal is represented by waveform (N) in FIG. 8.

The detected signal, represented by waveform (N), is supplied to a peak detector 178 which provides outputs of alternate peaks of the detected signal at terminals 80, 81, 82, and 83. Peak detector 178 is arranged to shut down or block the passage of the next peak after sensing and passing a first peak. This is indicated by the absence of a peak in waveform (O) corresponding to peak $P_4$ of waveform (N).

Subsequent to the occurrence of peak $P_4$, logic and control circuit 176 conditions peak detector 178 to pass the next peak $P_e$. This results from the drop in level of the signal represented by waveform (L) which is supplied to logic and control circuit 176. Upon sensing and passage of peak $P_e$, peak detector 178 shuts down until the level of waveform (L) rises. As a result, peak $P_f$ is not passed by peak detector 178, while peak $P_5$ is passed by the peak detector. This is shown by waveform (P). In this way, alternate peaks of the detected signals are passed by the peak detector. The taller peaks pass during the periods of the pulses represented by waveform (L) and the shorter peaks pass during the periods between pulses. This is shown by a comparison of waveforms (O) and (P) with waveform (L).

In order to assure proper synchronization of the sensing and passage of the taller and shorter peaks of the detected signal, the signal represented by waveform (K) also is supplied to logic and control circuit 176. This circuit is arranged to sense the change in level of the signal represented by waveform (K) and condition the passage of the next taller peak upon the sensing of such a change.

Logic and control circuit 176, in response to the detected signal represented by waveform (N), gates the outputs of peak $P_3$ to output terminal 84, peak $P_e$ to output terminal 85, peak $P_5$ to output terminal 86, and peak $P_c$ to output terminal 87. This aspect of the operation of logic and control circuit 176, in controlling switches 88, 89, 90 and 91, is similar to the operation of logic and control circuit 76 in FIG. 2. The difference between the outputs at terminals 84 and 85 (waveform (O)) and the difference between the outputs at terminals 86 and 87 (waveform (P)) represent the differences in amplitudes of the resonance peaks. As the amplitudes of the resonance peaks change, in accordance with movement of vane 26, the differences between the outputs also change.

By comparing the difference between the outputs at terminals 84 and 85 (waveform (O)) with the difference between the outputs at terminals 86 and 87, an indication of the position of vane 26 is developed. Waveforms (O) and (P) indicate that vane 26 is closer to coil 30 than to coil 28 because the difference between peaks $P_3$ and $P_e$ is greater than the difference between peaks $P_5$ and $P_c$.

It will be understood that the term "member", as used herein, applies to both a single component, such as steering column 18, and an assembly of components which move together. For example, the present invention can be adapted to measure tire pressure, in which case the "member" is an assembly of a tire, a wheel, and an axle.

The foregoing has set forth exemplary and preferred embodiments of the present invention. It will be understood, however, that various alternatives will occur to those of ordinary skill in the art without departure from the spirit and scope of the present invention.

What is claimed is:

1. Sensor apparatus comprising:
   a sensor unit including:
   (a) first and second inductively coupled tank circuits which produce a double resonance curve for said first tank circuit, said first tank circuit mechanically isolated from a member to which movement is imparted and said second tank circuit affixed to said member, and
   (b) sensing means affixed to said member, electrically connected to said second tank circuit and responsive to a parameter being monitored for changing the inductance of said second tank circuit in accordance with changes in the said parameter to change the relative resonance frequencies of said first tank circuit, the relative amplitudes of the resonance peaks of said first tank circuit, and the relative phases about the resonance peaks of said first tank circuit;
   and circuit means responsive to at least one of said changing characteristics of said first tank circuit for developing indications of changes in said parameter.

2. Sensor apparatus according to claim 1 wherein said circuit means include amplitude sensing means for developing a first indication representative of the amplitude of the lower resonance peak of said first tank circuit and a second indication representative of the amplitude of the higher resonance peak of said first tank circuit.

3. Sensor apparatus according to claim 2 wherein said amplitude sensing means include:
   (a) means for supplying a varying frequency signal to said first tank circuit to produce a varying amplitude signal having two peaks at the resonance frequencies of said first tank circuit; and
   (b) detection means responsive to said varying amplitude signal for developing said first and said second indications.

4. Sensor apparatus comprising:
   a sensor unit including:
   (a) first and second inductively coupled tank circuits which produce a double resonance curve for said first tank circuit, said first tank circuit mechanically isolated from a member to which movement is imparted and said second tank circuit affixed to said member, and
   (b) sensing means affixed to said member, electrically connected to said second tank circuit and responsive to a parameter being monitored for changing the inductance of said second tank circuit in accordance with changes in the said parameter to change the relative resonance frequencies of said first tank circuit, the relative amplitudes of the resonance peaks of said first tank circuit, and the relative phases about the resonance peaks of said first tank circuit;
   and circuit means responsive to at least one of said changing characteristics of said first tank circuit for developing indications of changes in said parameter, said circuit means including:

(a) means for supplying a varying frequency signal to said first tank circuit to produce a varying amplitude signal having two peaks at the resonance frequencies of said first tank circuit, (b) a first detector responsive to said varying amplitude signal for developing an envelope signal of said varying amplitude signal, (c) a peak detector responsive to said envelope signal for developing, in timed alternating sequence, a first output signal representative of the amplitude of the lower resonance peak and a second output signal representative of the amplitude of the higher resonance peak, and (d) gating means for gating said first output signal to a first output terminal and said second output signal to a second output terminal.

5. Sensor apparatus according to claim 4 wherein said gating means include:

(a) means responsive to said envelope signal for differentiating said envelope signal;

(b) means responsive to said differentiated envelope signal for limiting and delaying said differentiated envelope signal; and (c) means responsive to said limited and delayed differentiated envelope signal for gating said first output signal to said first output terminal and said second output signal to said second output terminal.

6. Sensor apparatus according to claim 5 wherein said circuit means further include indicating means responsive to said first output signal and said second output signal for developing an output indication of the relative amplitudes of said resonance peaks of said first tank circuit.

7. Sensor apparatus comprising:
a sensor unit including:

(a) first and second inductively coupled tank circuits which produce a double resonance curve for said first tank circuit, said first tank circuit mechanically isolated from a member to which rotational movement is imparted and said second tank circuit affixed to said member, the inductance coils of said first and said second tank circuits surrounding said member and rotationally symmetric about the rotation axis of said member, and (b) sensing means affixed to said member, electrically connected to said second tank circuit and responsive to a parameter being monitored for changing the inductance of said second tank circuit in accordance with changes in the said parameter to change the relative resonance frequencies of said first tank circuit, the relative amplitudes of the resonance peaks of said first tank circuit, and the relative phases about the resonance peaks of said first tank circuit;

and circuit means responsive to at least one of said changing characteristics of said first tank circuit for developing indications of changes in said parameter.

8. Sensor apparatus according to claim 7 wherein said inductance coils of said first and said second tank circuits are planar coils.

9. Sensor apparatus according to claim 7 wherein said sensing means include first and second inductively coupled inductance components having relative positions dependent upon said parameter to change the inductive coupling between said inductance components in accordance with changes in said parameter.

10. Sensor apparatus according to claim 9 wherein said parameter is torque applied to said member and said first and said second inductance components are affixed to said member at two points which are spaced apart along the axis of the torque applied to said member and have relative rotational positions about said axis dependent upon the torque applied to said member.

11. Sensor apparatus according to claim 7 wherein said sensing means include:

(a) first and second identical inductance components inductively coupled to a third inductance component and disposed on opposite sides of said third inductance component, the position of said third inductance component relative to said first and said second inductance components dependent upon said parameter to change the inductive coupling between said first and said third inductance components and the inductive coupling between said second and said third inductance components in accordance with changes in said parameter; and (b) switching means for electrically connecting said first inductance component and said second inductance component to said second tank circuit in timed alternating sequence.

12. Sensor apparatus according to claim 11 wherein said parameter is torque applied to said member and said first and said second inductance components are affixed to said member at a point spaced along the axis of the torque applied to said member from the point at which said third inductance component is affixed to said member, the rotational position of said third inductance component dependent upon the torque applied to said member.

13. Sensor apparatus according to claim 11 wherein said circuit means include:

(a) a pulse source which supplies a series of fixed duration pulses and the time between pulses is equal to the duration of said pulses;

(b) a power source responsive to said series of pulses for supplying power during said pulses;

and said switching means are responsive to said power source to connect said first inductance component to said second tank circuit during said pulses and to connect said second inductance component to said second tank circuit during the times between said pulses.

14. Sensor apparatus comprising:
a sensor unit including:

(a) first and second inductively coupled tank circuits which produce a double resonance curve for said first tank circuit, said first tank circuit mechanically isolated from a member to which movement is imparted and said second tank circuit affixed to said member, (b) third and fourth inductively coupled tank circuits which produce a double resonance curve for said third tank circuit, said third tank circuit identical to said first tank circuit and mechanically isolated from said member and said fourth tank circuit identical to said second tank circuit and affixed to said member, (c) sensing means affixed to said member and responsive to a parameter being monitored for changing the inductance of said second and said fourth tank circuits in accordance with changes in the said parameter to change the relative resonance frequencies of said first and said third tank circuits, respectively, the relative amplitudes of the resonance peaks of said first and said third tank circuits, respectively, and the relative phases about the resonance peaks of said first and said third tank circuits, respectively, said sensing means including first and second identical inductance components electrically connected to said second and fourth tank circuits, respectively, and inductively coupled to a third inductance component disposed between said first and said second inductance components, the position of said third inductance component relative to said first and said second inductance components dependent upon said parameter to change the inductive coupling between said first and said third inductance components and the inductive coupling between said second and said third inductance components in accordance with changes in said parameter, and (d) switching means for selecting said first and said third tank circuits in timed alternating sequence;

and circuit means coupled to said switching means and responsive to at least one of said changing characteristics of said first and third tank circuits for developing indications of changes in said parameter.

15. Sensor apparatus according to claim 14 wherein said member undergoes rotational movement and the inductance coils of said first, said second, said third and said fourth tank circuits surround said member and are rotationally symmetric about the rotation axis of said member.

16. Sensor apparatus according to claim 15 wherein said inductance coils of said first, said second, said third and said fourth tank circuits are planar coils.

17. Sensor apparatus according to claim 15 wherein said parameter is torque applied to said member and said first and said second inductance components are affixed to said member at a point spaced along the axis of the torque applied to said member from a point at which said third inductance component is affixed to said member, the rotational position of said third inductance component dependent upon the torque applied to said member.

18. Sensor apparatus according to claim 14 wherein:
(a) said circuit means include a pulse source which supplies a series of fixed duration pulses and the time between pulses is equal to the duration of said pulses; and
(b) said switching means are responsive to said series of pulses to connect said first tank circuit to said circuit means during said pulses and to connect said third tank circuit to said circuit means during the times between pulses.

19. Sensor apparatus comprising:
a sensor unit including:
(a) first and second inductively coupled tank circuits which produce a double resonance curve for said first tank circuit, said first tank circuit mechanically isolated from a member to which movement is imparted and said second tank circuit affixed to said member,
(b) sensing means affixed to said member and responsive to a parameter being monitored for changing the inductance of said second tank circuit in accordance with changes in the said parameter to change the relative resonance frequencies of said first tank circuit, the relative amplitudes of the resonance peaks of said first tank circuit, and the relative phases about the resonance peaks of said first tank circuit, said sensing means including first and second identical inductance components inductively coupled to a third inductance component disposed between said first and said second inductance components, the position of said third inductance component relative to said first and said second inductance components dependent upon said parameter to change the inductive coupling between said first and said third inductance components and the inductive coupling between said second and said third inductance components in accordance with changes in said parameter, and (c) switching means for electrically connecting said first inductance component and said second inductance component to said second tank circuit in timed alternating sequence;

and circuit means responsive to at least one of said changing characteristics of said first tank circuit for developing indications of changes in said 20. Sensor apparatus according to claim 19 wherein said member undergoes rotational movement and the inductance coils of said first and said second tank circuits surround said member and are rotationally symmetric about the rotation axis of said member.

21. Sensor apparatus according to claim 20 wherein said inductance coils of said first and said second tank circuits are planar coils.

22. Sensor apparatus according to claim 19 wherein said parameter is torque applied to said member and said first and said second inductance components are affixed to said member at a point spaced along the axis of the torque applied to said member from the point at which said third inductance component is affixed to said member, the rotational position of said third inductance component dependent upon the torque applied to said member.

23. Sensor apparatus according to claim 19 wherein said circuit means include:
(a) a pulse source which supplies a series of fixed duration pulses and the time between pulses is equal to the duration of said pulses;
(b) a power source responsive to said series of pulses for supplying power during said pulses;

and said switching means are responsive to said power source to connect said first inductance component to said second tank circuit during said pulses and to connect said second inductance component to said second tank circuit during the times between said pulses.

24. A torque indicating system comprising:
an inductance coil sensor composed of first and second inductively coupled tank circuits which produce a double resonance curve for said first tank circuit, said first tank circuit mechanically isolated from a member to which torque is applied and said second tank circuit affixed to said member;
a torque sensing unit composed of first and second inductance components affixed to said member at one point along the axis of the torque applied to said member and separated angularly about said axis and a third inductance component affixed to said member at a second point along said axis and having a portion extending between said first and said second inductance components to form inductive couplings with said first and said second inductance components, the position of said third inductance component relative to said first and said second inductance components varying in accordance with the torque applied to said member, thereby varying the inductive coupling between said third inductance component and said first inductance component in an opposite sense to variations in the inductive coupling between said third inductance component and said second inductance component;

means affixed to said member for connecting said first and said second inductance components to said second tank circuit in timed alternating sequence to sequentially change the inductance of said second tank circuit first in accordance with variations in the inductive coupling between said third inductance component and said first inductance component and then in accordance with variations in the inductive coupling between said third inductance component and said second inductance component, thereby changing the relative resonance frequencies of said first tank circuit, the relative amplitudes of the resonance peaks of said first tank circuit, and the relative phases about the resonance peaks of said first tank circuit first in accordance with variations in the inductive coupling between said third inductance component and said first inductance component and then in accordance with variations in the inductive coupling between said third inductance component and said second inductance compon- ent;

and circuit means mechanically isolated from said member and responsive to at least one of said changing characteristics of said first tank circuit for developing indications of changes in the torque applied to said member.

25. A torque indicating system according to claim 24 wherein said first and said second inductance components are identical planar coils.

26. A torque indicating system according to claim 25 wherein said third inductance component is a solid metal part.

27. A torque indicating system according to claim 25 wherein the inductances of said first and said second tank circuits are planar coils.

28. A torque indicating system according to claim 24 wherein said circuit means include means for transferring power and timing signals to said connecting means to operate and control said connecting means.

29. A torque indicating system according to claim 28 wherein said transferring means include a transformer having a primary winding mechanically isolated from said member and a secondary winding affixed to said member.

30. A torque indicating system according to claim 29 wherein said circuit means include:
(a) power source;
(b) a pulse source which supplies a series of fixed duration pulses separated by time periods equal to the duration of said pulses; and
(c) means for supplying power from said power source to said primary winding during said pulses;
and said connecting means include:
(a) means connected to said secondary winding for detecting said pulses and for developing power to operate said switching means; and
(b) switching means responsive to said detected pulses for connecting said first inductance to said second tank circuit during said detected pulses and for connecting said second inductance to said second tank circuit between said detected pulses.

31. A torque indicating system comprising:
a first inductance coil sensor composed of first and second inductively coupled tank circuits which produce a double resonance curve for said first tank circuit, said first tank circuit mechanically isolated from a member to which torque is applied and said second tank circuit affixed to said member;
a second inductance coil sensor composed of third and fourth inductively coupled tank circuits which produce a double resonance curve for said third tank circuit, said third tank circuit mechanically isolated from said member and said fourth tank circuit affixed to said member;
a torque sensing unit composed of (a) a first inductance component electrically connected to said second tank circuit and affixed to said member at a first point along the axis of the torque applied to said member, (b) a second inductance component electrically connected to said fourth tank circuit and affixed to said member at said first point but separated angularly about said axis from said first inductance component, and (c) a third inductance component affixed to said member at a second point along said axis and having a portion extending between said first and said second inductance components to form inductive couplings with said first and said second inductance components, the position of said third inductance component relative to said first and said second inductance components varying in accordance with the torque applied to said member, thereby varying the inductive coupling between said third inductance component and said first inductance component in an opposite sense to variations in the inductive coupling between said third inductance component and said second inductance component and changing the relative resonance frequencies of said first and said third tank circuits, the relative amplitudes of the resonance peaks of said first and said third tank circuits, and the relative phases about the resonance peaks of said first and said third tank circuits;

circuit means mechanically isolated from said member and responsive to at least one of said changing charactreristics of said first and said third tank circuits for developing indications of changes in the torque applied to said member;

and means mechanically isolated from said member for connecting said first and said third tank circuits to said circuit means in timed alternating sequence to develop said indications of changes in the torque applied to said member first from said changing characteristic of said first tank circuit and then from said changing characteristic of said third tank circuit.

32. A torque indicating system according to claim 31 wherein said first and said second inductance components are identical planar coils.

33. A torque indicating system according to claim 32 wherein said third inductance component is a solid metal part.

34. A torque indicating system according to claim 32 wherein the inductances of said first, said second, said third, and said fourth tank circuits are planar coils.

35. A torque indicating system according to claim 31 wherein said circuit means include a pulse source which supplies a series of fixed duration pulses separated by time periods equal to the duration of said pulses and said connecting means include switching means responsive to said pulses for connecting said first tank circuit to said circuit means during said pulses and for connecting said third tank circuit to said circuit means between said pulses.

36. Sensor apparatus comprising:
a sensor unit including:
(a) first and second inductively coupled tank circuits which produce a double resonance curve for said first tank circuit,
(b) first and second identical inductance components inductively coupled to a third inductance component and disposed on opposite sides of said third inductance component, the position of said third inductance component relative to said first and said second inductance components dependent upon a parameter being monitored to change the inductive coupling between said first and said third inductance components and the inductive coupling between said second and said third inductance components in accordance with changes in said parameter, and
(c) switching means for electrically connecting said first inductance component and said second inductance component to said second tank circuit in timed alternating sequence to change the relative resonance frequencies of said first tank circuit, the relative amplitudes of the resonance peaks of said first tank circuit, and the relative phases about the resonance peaks of said first tank circuit;
and a signal processing circuit including:
(a) first circuit means for supplying a repetitively increasing and decreasing frequency signal to said first tank circuit to develop a first double resonance during periods of increasing frequency and a second double resonance during periods of decreasing frequency,
(b) second circuit means for supplying a switching signal to said switching means,
(c) third circuit means for supplying control signals to said first circuit means and said second circuit means to connect said first inductance component to said second tank circuit during said periods of increasing frequency and to connect said second inductance component to said second tank circuit during said periods of decreasing frequency, and
(d) fourth circuit means responsive to said first tank circuit for measuring at least one of said changing characteristics of said first tank circuit at each resonance of said first tank circuit to develop indications of changes in said parameter.

37. Sensor apparatus according to claim 36 wherein said circuit means include amplitude sensing means responsive to said first and said second double resonances for developing a first indication representative of the difference in amplitudes of the lower and higher resonance peaks of said first double resonance and a second indication representative of the difference in amplitudes of the lower and higher resonance peaks of said second double resonance.

38. Sensor apparatus according to claim 37 wherein said amplitude sensing means include:
(a) a first detector responsive to said first and said second double resonances for developing an envelope signal of said double resonances;
(b) a peak detector responsive to said envelope signal for developing a first output signal representative of the amplitude of said lower resonance peak of said first double resonance, a second output signal representative of the amplitude of said higher resonance peak of said first double resonance, a third output signal representative of the amplitude of said higher resonance peak of said second double resonance, and a fourth output signal representative of the amplitude of said lower resonance peak of said second double resonance; and
(c) gating means for gating said first output signal to a first output terminal, said second output signal to a second output terminal, said third output signal to a third output terminal, and said fourth output signal to a fourth output terminal.

39. Sensor apparatus according to claim 38 wherein said gating means are responsive to said control signals to synchronize the gating of said output signals with the connections of said first and said second inductance components to said second tank circuit.

40. Sensor apparatus comprising:
a sensor unit including
(a) first and second inductively coupled tank circuits which produce a double resonance curve for said first tank circuit,
(b) first and second identical inductance components inductively coupled to a third inductance component and disposed on opposite sides of said third inductance component, the position of said third inductance component relative to said first and said second inductance components dependent upon a parameter being monitored to change the inductive coupling between said first and said third inductance components and the inductive coupling between said second and said third inductance components in accordance with changes in said parameter, and
(c) switching means for electrically connecting said first inductance component and said second inductance component to said second tank circuit in timed alternating sequence to change the relative resonance frequencies of said first tank circuit, the relative amplitudes of the resonance peaks of said first tank circuit, and the relative phases about the resonance peaks of said first tank circuit;
and a signal processing circuit including:
(a) first circuit means for supplying a repetitively increasing and decreasing frequency signal to said first tank circuit to develop a first double resonance during periods of increasing frequency and a second double resonance during periods of decreasing frequency,
(b) second circuit means for supplying a switching signal to said switching means,
(c) third circuit means for supplying first control signals to said first circuit means and said second control signals to said second circuit means to first connect said first inductance component to said second tank circuit during a first complete cycle of increasing and decreasing frequency and then to connect said second inductance component to said second tank circuit during a second complete cycle of increasing and decreasing frequency, and
(d) fourth circuit means responsive to said first tank circuit for measuring at least one of said changing characteristics of said first tank circuit at alternate resonances of said first tank circuit to develop indications of changes in said parameter.

41. Sensor apparatus according to claim 40 wherein said circuit means include amplitude sensing means responsive to said first and said second double resonances for developing during said first complete cycle of increasing and decreasing frequency a first indication representative of the difference in amplitudes of the lower resonance peak of said first double resonance and the higher resonance peak of said second double resonance and during said second complete cycle of increasing and decreasing frequency a second indication representative of the difference in amplitudes of the lower resonance peak of said first double resonance and the higher resonance peak of said second double resonance.

42. Sensor apparatus according to claim 41 wherein said amplitude sensing means include:
   (a) a first detector responsive to said first and said second double resonances for developing an envelope signal of said double resonances;
   (b) a peak detector responsive to said envelope signal for developing a first output signal representative of the amplitude of said lower resonance peak of said first double resonance during said first complete cycle of increasing and decreasing frequency, a second output signal representative of the amplitude of said higher resonance peak of said second double resonance during said first complete cycle of increasing and decreasing frequency, a third output signal representative of the amplitude of said lower resonance peak of said first double resonance during said second complete cycle of increasing and decreasing frequency, and a fourth output signal representative of the amplitude of said higher resonance peak of said second double resonance during said second complete cycle of increasing and decreasing frequency; and,
   (c) gating means for gating said first output signal to a first output terminal, said second output signal to a second output terminal, said third output signal to a third output terminal, and said fourth output signal to a fourth output terminal.

43. Sensor apparatus according to claim 42 wherein said gating means are responsive to said control signals to synchronize the gating of said output signals with the connections of said first and second inductance components to said second tank circuit.

44. Sensor apparatus comprising:
   a sensor unit including:
   (a) first and second inductively coupled tank circuits which produce a first double resonance curve for said first tank circuit,
   (b) third and fourth inductively coupled tank circuits which are identical to said first and said second tank circuits, respectively, and produce a second double resonance curve for said third tank circuit identical to said first double resonance curve,
   (c) first and second identical inductance components electrically connected to said second and fourth tank circuits, respectively, and inductively coupled to a third inductance component disposed between said first and said second inductance components, the position of said third inductance component relative to said first and said second inductance components dependent upon a parameter being monitored to change the inductive coupling between said first and said third inductance components and the inductive coupling between said second and said third inductance components in accordance with changes in said parameter, thereby changing the relative resonance frequencies of said first and said third tank circuits, the relative amplitudes of the resonance peaks of said first and said third tank circuits, and the relative phases about the resonance peaks of said first and said third tank circuits,
   (d) switching means for selecting between said first and said third tank circuits in timed alternating sequence;
   and a signal processing circuit including:
   (a) first circuit means for supplying a repetitively increasing and decreasing frequency signal to said switching means to develop a first double resonance during periods of increasing frequency and a second double resonance during periods of decreasing frequency,
   (b) second circuit means for supplying a switching signal to said switching means,
   (c) third circuit means for supplying control signals to said first circuit means and said second circuit means to select said first tank circuit during said periods of increasing frequency and to select said third tank circuit during said periods of decreasing frequency, and
   (d) fourth circuit means responsive to said first and said third tank circuits for measuring at least one of said changing characteristics of said first and said third tank circuits at each resonance of said first and said third tank circuits to develop indications of changes in said parameter.

45. Sensor apparatus according to claim 44 wherein said circuit means include amplitude sensing means responsive to said first and said second double resonances for developing a first indication representative of the difference in amplitudes of the lower and higher resonance peaks of said first double resonance and a second indication representative of the difference in amplitudes of the lower and higher resonance peaks of said second double resonance.

46. Sensor apparatus according to claim 45 wherein said amplitude sensing means include:
   (a) a first detector responsive to said first and said second double resonances for developing an envelope signal of said double resonances;
   (b) a peak detector responsive to said envelope signal for developing a first output signal representative of the amplitude of said lower resonance peak of said first double resonance, a second output signal representative of the amplitude of said higher resonance peak of said first double resonance, a third output signal representative of the amplitude of said higher resonance peak of said second double resonance, and a fourth output signal representative of the amplitude of said lower resonance peak of said second double resonance; and
   (c) gating means for gating said first output signal to a first output terminal, said second output signal to a second output terminal, said third output signal to a third output terminal, and said fourth output signal to a fourth output terminal.

47. Sensor apparatus according to claim 46 wherein said gating means are responsive to said control signals to synchronize the gating of said output signals with the selections of said first and said third tank circuits.

48. Sensor apparatus comprising:
   a sensor unit including:
   (a) first and second inductively coupled tank circuits which produce a first double resonance curve for said first tank circuit,
   (b) third and fourth inductively coupled tank circuits which are identical to said first and said second tank circuits, respectively, and produce a second double resonance curve for said third tank circuit identical to said first double resonance curve, (c) first and second identical inductance components electrically connected to said second and fourth tank circuits, respectively, and inductively coupled to a third inductance component disposed between said first and said second inductance components, the position of said third inductance component relative to said first and said second inductance components dependent upon a parameter being monitored to change the inductive coupling between said first and said third inductance components and the inductive coupling between said second and said third inductance components in accordance with changes in said parameter, thereby changing the relative resonance frequencies of said first and said third tank circuits, the relative amplitudes of the resonance peaks of said first and said third tank circuits, and the relative phases about the resonance peaks of said first and said third tank circuits, (d) switching means for selecting between said first and said third tank circuits in timed alternating sequence;

and a signal processing circuit including:

(a) first circuit means for supplying a repetitively increasing and decreasing frequency signal to said switching means to develop a first double resonance during periods of increasing frequency and a second double resonance during periods of decreasing frequency, (b) second circuit means for supplying a switching signal to said switching means, (c) third circuit means for supplying first control signals to said first circuit means and second control signals to said second circuit means to first select said first tank circuit during a first complete cycle of increasing and decreasing frequency and then select said third tank circuit during a second complete cycle of increasing and decreasing frequency, and (d) fourth circuit means responsive to said first and said third tank circuits for measuring at least one of said changing characteristics of said first and said third tank circuits at alternate resonances of said first and said third tank circuits to develop indications of changes in said parameter.

49. Sensor apparatus according to claim 48 wherein said circuit means include amplitude sensing means responsive to said first and said second double resonances for developing during said first complete cycle of increasing and decreasing frequency a first indication representative of the difference in amplitudes of the lower resonance peak of said first double resonance and the higher resonance peak of said second double resonance and during said second complete cycle of increasing and decreasing frequency a second indication representative of the difference in amplitudes of the lower resonance peak of said first double resonance and the higher resonance peak of said second double resonance.

50. Sensor apparatus according to claim 49 wherein said amplitude sensing means include:

(a) a first detector responsive to said first and said second double resonances for developing an envelope signal of said double resonances;

(b) a peak detector responsive to said envelope signal for developing a first output signal representative of the amplitude of said lower resonance peak of said first double resonance during said first complete cycle of increasing and decreasing frequency, a second output signal representative of the amplitude of said higher resonance peak of said second double resonance during said first complete cycle of increasing and decreasing frequency, a third output signal representative of the amplitude of said lower resonance peak of said first double resonance during said second complete cycle of increasing and decreasing frequency, and a fourth output signal representative of the amplitude of said higher resonance peak of said second double resonance during said second complete cycle of increasing and decreasing frequency; and (c) gating means for gating said first output signal to a first output terminal, said second output signal to a second output terminal, said third output signal to a third output terminal, and said fourth output signal to a fourth output terminal.

51. Sensor apparatus according to claim 50 wherein said gating means are responsive to said control signals to synchronize the gating of said output signals with the selections of said first and said third tank circuits.

52. Sensor apparatus comprising:

a sensor unit including:

(a) first and second inductively coupled tank circuits which produce a double resonance curve for said first tank circuit, said first tank circuit mechanically isolated from a member to which movement is imparted and said second tank circuit affixed to said member, and (b) sensing means affixed to said member, electrically connected to said second tank circuit and responsive to a parameter being monitored for changing, in accordance with changes in the said parameter, the relative resonance frequencies of said first tank circuit, the relative amplitudes of the resonance peaks of said first tank circuit, and the relative phases about the resonance peaks of said first tank circuit;

and circuit means responsive to at least one of said changing characteristics of said first tank circuit for developing indications of changes in said parameter.

* * * * *